United States Patent
Ball et al.

(10) Patent No.: US 7,590,845 B2
(45) Date of Patent: Sep. 15, 2009

(54) KEY CACHE MANAGEMENT THROUGH MULTIPLE LOCALITIES

(75) Inventors: Charles Douglas Ball, Raleigh, NC (US); Ryan Charles Catherman, Raleigh, NC (US); James Patrick Hoff, Raleigh, NC (US); James Peter Ward, Apex, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 495 days.

(21) Appl. No.: 10/744,441

(22) Filed: Dec. 22, 2003

(65) Prior Publication Data

US 2005/0135626 A1 Jun. 23, 2005

(51) Int. Cl.
*H04L 9/14* (2006.01)
*G06F 12/08* (2006.01)
(52) U.S. Cl. .................................. 713/171; 711/118
(58) Field of Classification Search ............... 711/133, 711/141
See application file for complete search history.

(56) References Cited

U.S. PATENT DOCUMENTS

| | | | | |
|---|---|---|---|---|
| 5,495,533 | A * | 2/1996 | Linehan et al. ............. | 713/155 |
| 5,745,572 | A * | 4/1998 | Press ......................... | 380/280 |
| 6,038,651 | A | 3/2000 | VanHuben et al. | |
| 6,073,129 | A | 6/2000 | Levine et al. | |
| 6,119,151 | A | 9/2000 | Cantrell et al. | |
| 6,216,199 | B1 | 4/2001 | DeKoning et al. | |
| 6,307,936 | B1 * | 10/2001 | Ober et al. .................... | 380/30 |
| 6,470,426 | B2 | 10/2002 | Burnett | |
| 6,981,138 | B2 * | 12/2005 | Douceur et al. ............. | 713/153 |
| 2002/0032839 | A1 | 3/2002 | Yamamoto et al. | |
| 2002/0046324 | A1 | 4/2002 | Barroso et al. | |
| 2002/0078301 | A1 | 6/2002 | Burnett | |
| 2002/0083271 | A1 | 6/2002 | Mounes-Toussi | |
| 2002/0101995 | A1 * | 8/2002 | Hashimoto et al. .......... | 380/277 |
| 2003/0110358 | A1 | 6/2003 | Goldberg et al. | |
| 2003/0138105 | A1 * | 7/2003 | Challener et al. ........... | 380/277 |

FOREIGN PATENT DOCUMENTS

JP 2003-280989 3/2003

OTHER PUBLICATIONS

IBM Technical Disclosure Bulletin, "Selective Invalidation Scheme for Software MP Cache Coherence Control", J.K. Peir and J.H. Tang, vol. 35, No. 3, Aug. 1992.
IBM Research Disclosure, "Efficient Cache Management," Dec. 1998 (416139).

* cited by examiner

*Primary Examiner*—Gary J. Portka
(74) *Attorney, Agent, or Firm*—Sawyer Law Group LLP; Carlos Munoz-Bustamante

(57) ABSTRACT

A method for a plurality of key cache managers for a plurality of localities to share cryptographic key storage resources of a security chip, includes: loading an application key into the key storage; and saving a restoration data for the application key by a key cache manager, where the restoration data can be used by the key cache manager to re-load the application key into the key storage if the application key is evicted from the key storage by another key cache manager. The method allows each of a plurality of key cache managers to recognize that its key had been removed from the security chip and to restore its key. The method also allows each key cache manager to evict or destroy any key currently loaded on the security chip without affecting the functionality of other localities.

17 Claims, 4 Drawing Sheets

KEY CACHE MANAGEMENT THROUGH MULTIPLE LOCALITIES

FIELD OF THE INVENTION

The present invention relates to hardware security architectures, and more particularly to trusted platform module security architectures.

BACKGROUND OF THE INVENTION

FIG. 1 illustrates a conventional hardware security architecture. The architecture includes a security chip 101 and a memory 102 in a computer system. The memory 102 is separated into different localities, such as Locality 1 (103) and Locality 3 (104). Various applications 105-108 execute from each locality. Each locality also has its own key cache manager 111-112. Each key cache manager 111-112 manages the cryptographic storage of application security keys in the key storage 110 of the security chip 101. For example, the key cache manger 111 encrypts the key of the application 105 using the public key of the security chip 101. The public key is part of the public/private key pair, or storage root key (SRK) 109, for the security chip 101. The encrypted application key is then sent to the security chip 101. The security chip 101 decrypts the encrypted application key using its own private key, and stores the application key on the chip 101. Then, when the application 105 later requests the use of its key, the key cache manager 111 can service the request using the application key stored on the security chip 101.

However, in this architecture, the key cache managers 111-112 function with mutual distrust, i.e., neither key cache managers 111-112 trusts that the other will leave the key storage 110 in the same state. Thus, for example, if the key storage 110 is full, the key cache manager 112 can evict a currently loaded key in order to store another key for an application in its own locality 3 (104). If the evicted key is from an application within its locality, the key cache manager 112 tracks the storage of these keys. However, the key cache manager 112 can evict a key for an application in another locality, such as Locality 1 (103). Since the key cache managers 111 and 112 do not communicate with each other, the key cache manager 111 would not be aware of the eviction of one of its keys by the key cache manger 112. Thus, when the key cache manager 111 goes to the key storage 110 to access its key, the wrong key is used. This results in coherency problems. One way to avoid these problems is to limit access of the security chip 101 to the applications in one locality. However, this prevents applications in other localities from taking advantage of the features of the security chip 101.

Accordingly, there exists a need for a method for a plurality of key cache managers to share the cryptographic key storage resources of a security chip. This method should allow key cache managers of different localities to access the security chip without coherency problems. The present invention addresses such a need.

SUMMARY OF THE INVENTION

A method and a computer readable medium with program instructions are disclosed for a plurality of key cache managers for a plurality of localities to share cryptographic key storage resources of a security chip, includes: loading an application key into the key storage; and saving a restoration data for the application key by a key cache manager, where the restoration data can be used by the key cache manager to reload the application key into the key storage if the application key is evicted from the key storage by another key cache manager. The method allows each of a plurality of key cache managers to recognize that is key had been removed from the security chip and to restore its key. The method also allows each key cache manager to evict or destroy any key currently loaded on the security chip without affecting the functionality of other localities.

DETAILED DESCRIPTION

The present invention provides a method for a plurality of key cache managers to share the cryptographic key storage resources of a security chip. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention allows each of a plurality of key cache managers to recognize that its key had been removed from the security chip and to restore its key. The method also allows each key cache manager to evict or destroy any key currently loaded on the security chip without affecting the functionality of other localities.

Figure 4A:
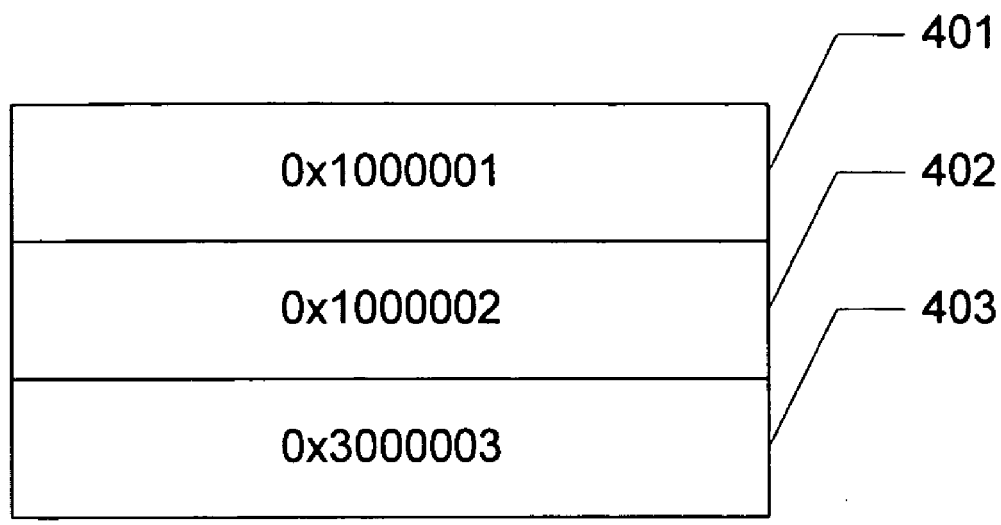
FIGS. 4A and 4B illustrate example keys stored in the key storage in accordance with the present invention.
Figure 4B:
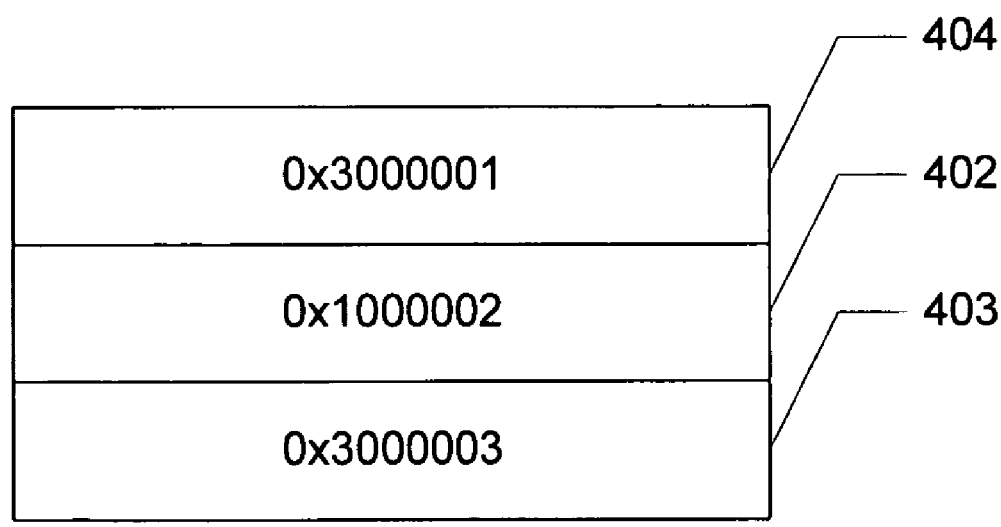

To more particularly describe the features of the present invention, please refer to FIGS. 2 and 4B in conjunction with the discussion below.

Figure 1:
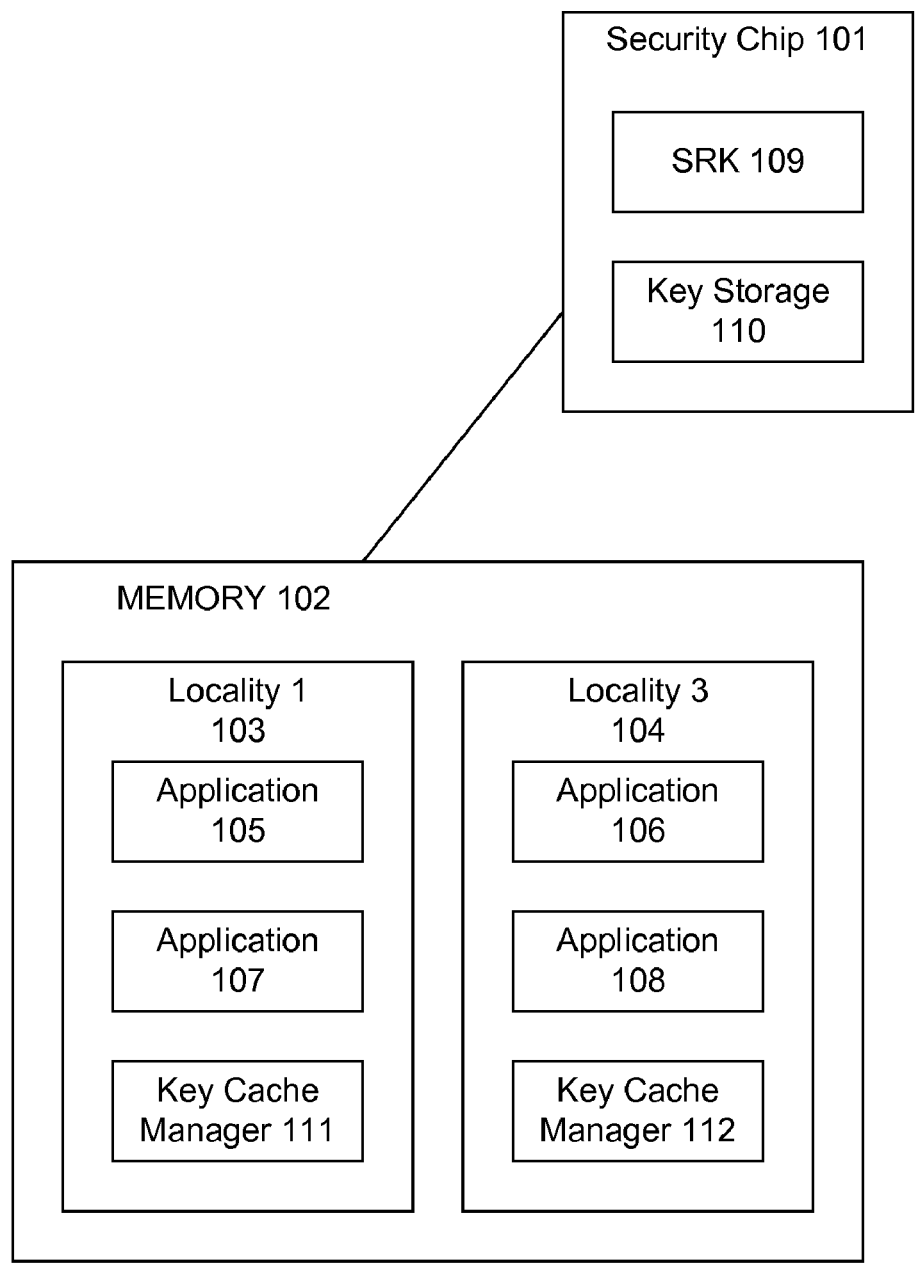
FIG. 1 illustrates a conventional hardware security architecture.
Figure 2:
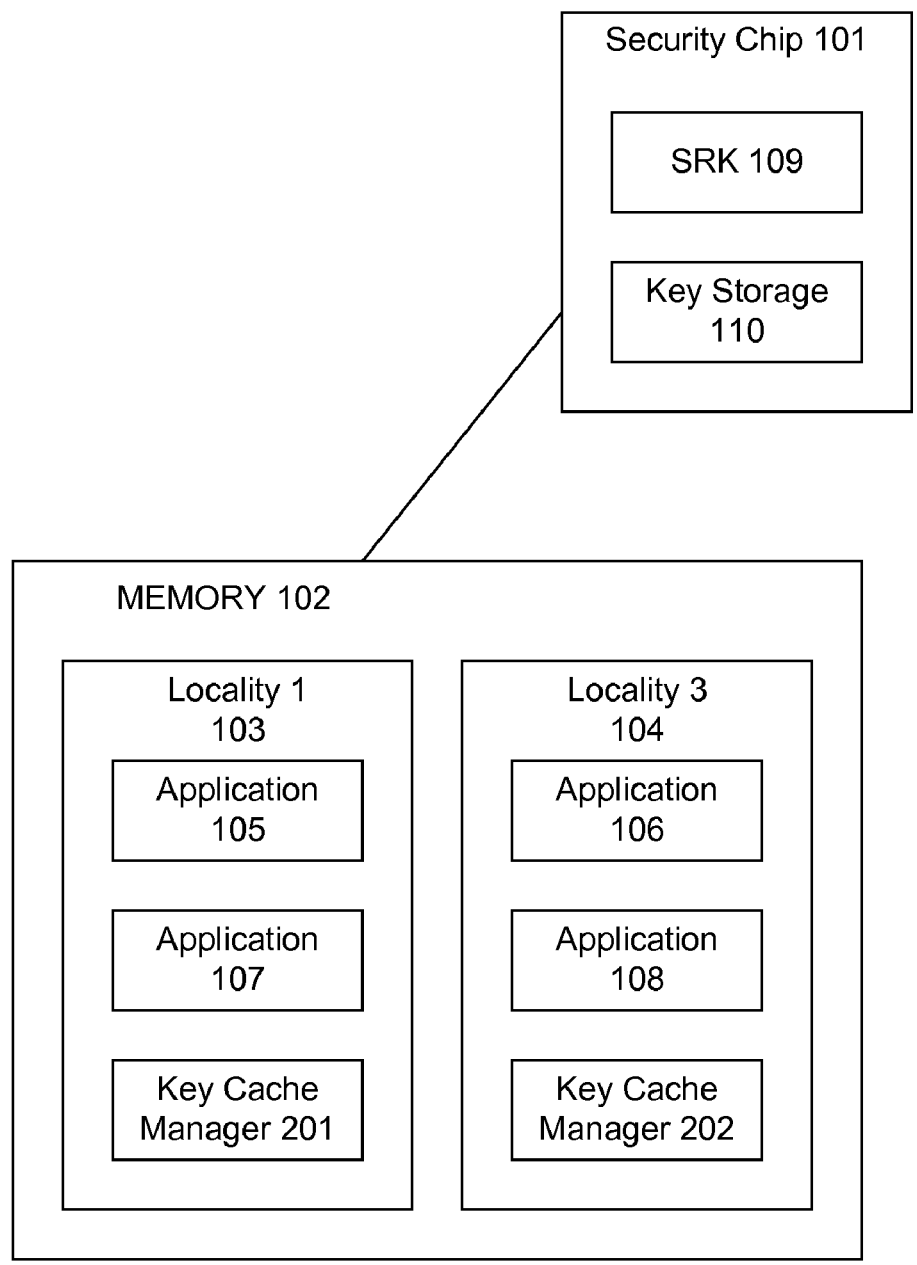
FIG. 2 illustrates a hardware security architecture in accordance with the present invention.

FIG. 2 illustrates a hardware security architecture in accordance with the present invention. The architecture comprises the same elements as the conventional architecture illustrates in FIG. 1, except the key cache managers 201-202 comprise code to implement the method in accordance with the present invention, as described below.

Figure 3:
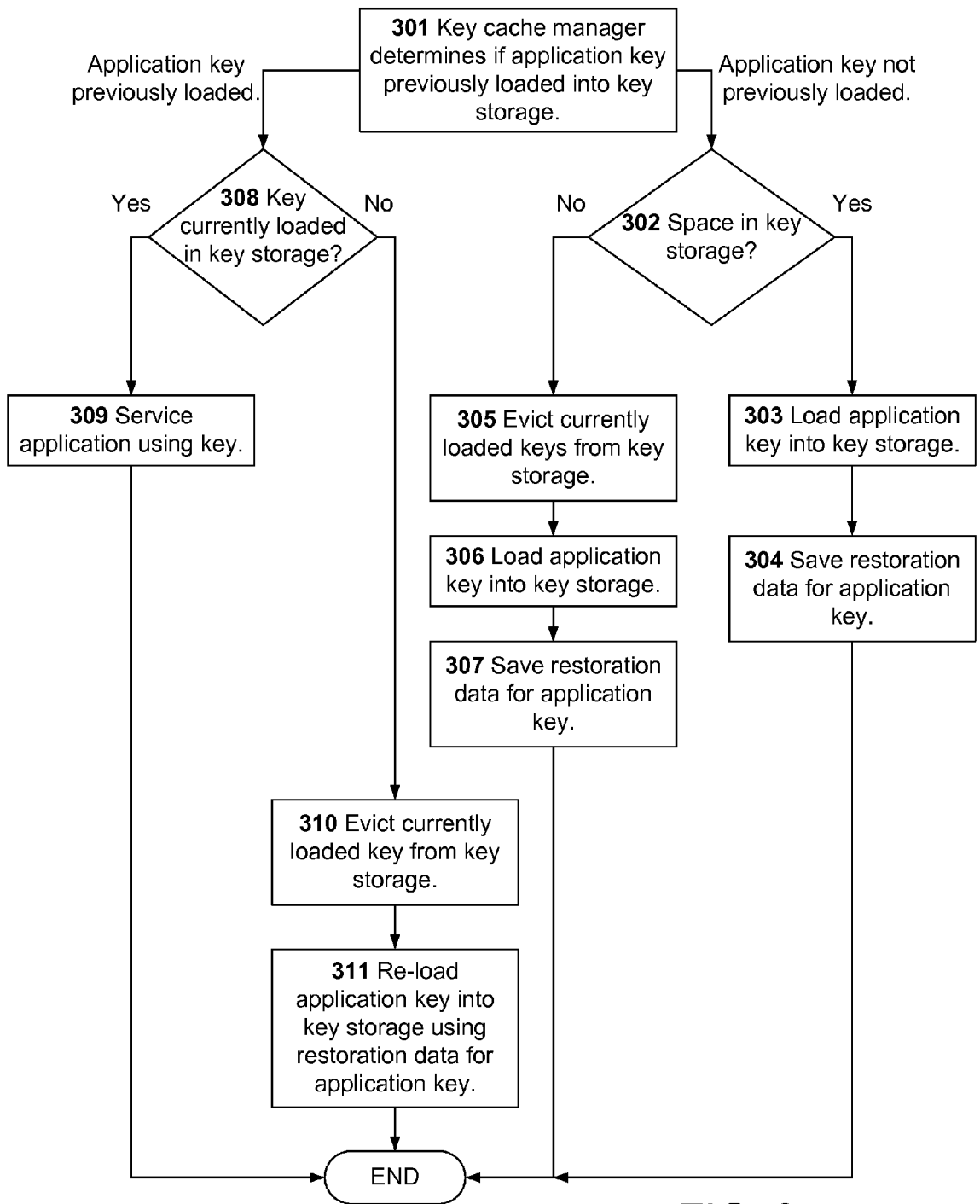
FIG. 3 is a flowchart illustrating a preferred embodiment of the method for a plurality of key cache managers to share the cryptographic key storage resources of a security chip in accordance with the present invention.

FIG. 3 is a flowchart illustrating a preferred embodiment of the method for a plurality of key cache managers to share the cryptographic key storage resources of a security chip in accordance with the present invention. To load a key into the key storage 110, a key cache manager, such as key cache manager 201, first determines if the application key to load was previously loaded into the key storage 110, via step 301. If not, then the key cache manager 201 determines if the key storage 110 has an opening, via step 302. If the key storage 110 has an opening, then the key cache manager 201 loads the application key, via step 303. In the preferred embodiment, the key cache manager 201 encrypts the application key with the security chip's public key. The security chip 101 decrypts the application key using its own private key and stores the application key in the key storage 110. In addition to having the application key loaded, the key cache manager 201 also saves restoration data for the application key, via step 304. The restoration data is essentially a copy of the application key, which is stored in a knowledge database. The use of the restoration data is described below.

If there are no openings in the key storage 110, then the key cache manager 201 evicts a currently loaded key, via step 305. It then loads the application key into the new opening created by the eviction, via step 306. In addition, the key cache manager 201 saves the restoration data for the application key, via step 307.

Once the application key has been loaded into the key storage 110, when the application requests the use of its key, the key cache manager 201 determines if the application key is currently loaded in the key storage 110, via step 308, i.e., it has not been evicted by another key cache manager. If the application key is currently loaded, then the application's request is serviced using the application key, via step 309. If not, then the key cache manager 201 evicts one of the keys currently loaded in the key storage 110, via step 310, and then uses the restoration data for the application key to reload the application key into the key storage 110, via step 311.

For example, assume that the key storage 110 holds three keys at a time. FIG. 4A illustrates example keys stored in the key storage 110. Assume that a first application key 401 for an application 105 in Locality 1 (103) is to be stored on the key storage 110. In storing this key 401, the key cache manager 201 first determines if the first application key 401 has been loaded into the key storage 110, via step 301. Since it has not, the key cache manager 201 then determines if the key storage 110 is full, via step 302. Since it is not, then the key cache manager 201 then calls a function, LoadKey, to load the first application key 401 into the key storage 110, via step 303. The first application key 401 is given a tag, "0x1000001", which uniquely identifies the locality of the key's application. In this example, the "1" near the beginning of the tag identifies Locality 1 (103) as the key's source. The key cache manager 201 then immediately calls a function, SaveContextPersist, which returns the restoration data for the first application key 401. This restoration data is stored by the key cache manager 201, via step 304.

Assume also that a second application key 402 for an application 107 in Locality 1 (103) is to be stored on the key storage 110. In storing this key 402, the key cache manager 201 first determines if the second application key 402 has been loaded into the key storage 110, via step 301. Since it has not, the key cache manager 201 then determines if the key storage 110 is full, via step 302. Since it is not, then the key cache manager 201 then calls a function, LoadKey, to load the second application key 402 into the key storage 110, via step 303. The second application key 402 is given a tag, "0x1000002", which uniquely identifies the locality of the key's application. In this example, the "1" near the beginning of the tag identifies Locality 1 (103) as the key's source. The key cache manager 201 then immediately calls a function, SaveContextPersist, which returns the restoration data for the second application key 402. This restoration data is stored by the key cache manager 201, via step 304.

Then, assume that a third application key 403 for an application in Locality 3 (104) is to be stored in the key storage 110. In storing this key 403, the key cache manager 202 first determines if the third application key 403 has been loaded into the key storage 110, via step 301. Since it has not, the key cache manager 202 then determines if the key storage 110 is full, via step 302. Since it is not, then the key cache manager 202 calls the LoadKey function to load the third application key 403 into the key storage 110, via step 303. The third application key 403 is given a tag, "0x3000003", where the "3" near the beginning of the tag uniquely identifies Locality 3 (104) as the key's source. The key cache manager 202 also calls the function, SaveContextPersist, which returns the restoration data for the third application key 403. This restoration data is stored by the key cache manager 202, via step 304.

Assume now that another application 108 in Locality 3 (104) wants to load a fourth application key 404 into the key storage 10. The key cache manager 202 determines that this fourth application key 404 has not been loaded onto the key storage 110, via step 301. It also determines that there are no openings in the key storage 110, via step 302. The key cache manager 202 then evicts a currently loaded key, via step 305, such as the first application key 401. The key cache manager 202 then loads the fourth application key 404 into the key storage 110, via step 306. This key is given a tag, "0x3000001". FIG. 4B illustrates the example application keys stored in the key storage 110 after the first application key 401 is evicted, and the fourth application key 404 is loaded. The SaveContextPersist function is also called, and the key cache manager is returned the restoration data for the fourth application key 404, which is then saved, via step 307.

Assume that the owner of the first application key 401 now requests use of its key. The key cache manager 201 determines that the first application key 401 has already been loaded onto the key storage 110, via step 301. The key cache manager 201 then determines if the first application key 401 is currently loaded in the key storage 110, via step 308. It does so by examining the tag for the key currently loaded in the key storage 110 in the location for the first application key 401. Since the currently loaded key's tag is "0x3000001", the key cache manager 201 knows that this key does not belong to any of the applications in Locality 1 (103). The key cache manager 201 then evicts the currently loaded fourth application key 404 from the key storage 110, via step 310, and reloads the first application key 401, via step 311, using the restoration data for the first application key 401 previously saved in step 394. The keys stored in the key storage 110 then again are as illustrated in FIG. 4A.

Although the preferred embodiment is described above with the key load and the saving of the restoration data as separate steps, one of ordinary skill in the art will understand that the key load and the saving of the restoration data can be performed with one function call without departing from the spirit and scope of the present invention.

A method for a plurality of key cache managers to share the cryptographic key storage resources of a security chip has been disclosed. The method allows each of a plurality of key cache managers to recognize that its key had been removed from the security chip and to restore its key. The method also allows each key cache manager to evict or destroy any key currently loaded on the security chip without affecting the functionality of other localities.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for a plurality of key cache managers to share a cryptographic key storage of a security chip, each key cache manager being associated with a different locality of a memory relative to others of the plurality of key cache managers and managing application key storage for one or more applications that executes from the locality associated with the key cache manager, the method comprising:

loading, by a first key manager associated with a first locality of the memory, a first application key into the cryptographic key storage of the security chip, the first application key being associated with a first application associated with a first locality within the memory; and saving, by the first key manager, a first restoration data for the first application key, wherein the first restoration data is useable by the first key cache manager to re-load the first application key into the cryptographic key storage of the security chip responsive to the first application key having been evicted from the cryptographic key storage by a second key cache manager associated with a second locality within the memory that is different from the first locality.

2. The method of claim 1, wherein loading the first application key into the cryptographic key storage of the security chip includes evicting a previously loaded application key from the cryptographic key storage of the security chip responsive to the cryptographic key storage being full.

3. The method of claim 1, further comprising:

re-loading the first application key into the cryptographic key storage using the first restoration data responsive to the first application key having been evicted from the cryptographic key storage and the first application requiring use of the first application key.

4. The method of claim 1, further comprising:

loading a second application key into the cryptographic key storage of the security chip, the second application key being associated with a second application of the second locality within the memory; and the second key cache manager saving second restoration data for the second application key, wherein the second restoration data is useable by the second key cache manager to re-load the second application key into the cryptographic key storage of the security chip responsive to the second application key is—having been evicted from the cryptographic key storage by another key cache manager.

5. The method of claim 4, wherein loading the second application key into the cryptographic key storage of the security chip includes evicting a previously loaded application key from the cryptographic key storage of the security chip responsive to the cryptographic key storage being full.

6. The method of claim 4, further comprising:

re-loading the second application key into the cryptographic key storage using the second restoration data responsive to the second application key having been evicted from the cryptographic key storage and the second application requiring use of the second application key.

7. A computer program product having a computer readable medium tangibly embodying executable code for a plurality of key cache managers to share a cryptographic key storage of a security chip, each key cache manager being associated with a different locality of a memory relative to others of the plurality of key cache managers and managing application key storage for one or more applications that executes from the locality associated with the key cache manager, the computer program comprising computer executable instructions for:

loading, by a first key manager associated with a first locality of the memory, a first application key into the cryptographic key storage of the security chip, the first application key being associated with a first application associated with a first locality within the memory; and saving, by the first key manager, a first restoration data for the first application key, wherein the first restoration data is useable by the first key cache manager to re-load the first application key into the cryptographic key storage of the security chip responsive to the first application key having been evicted from the cryptographic key storage by a second key cache manager associated with a second locality within the memory that is different from the first locality.

8. The computer product of claim 7, wherein the computer executable instructions for loading the first application key into the cryptographic key storage of the security chip include computer executable instructions for evicting a previously loaded application key from the cryptographic key storage of the security chip responsive to the cryptographic key storage being full.

9. The computer product of claim 7, further comprising computer executable instructions for:

re-loading the first application key into the cryptographic key storage using the first restoration data responsive to the first application key having been evicted from the cryptographic key storage and the first application requiring use of the first application key.

10. The computer product of claim 7, further comprising computer executable instructions for:

loading a second application key into the cryptographic key storage of the security chip, the second application key being associated with a second application of the second locality within the memory; and the second key cache manager saving a second restoration data for the second application key, wherein the second restoration data is useable by the second key cache manager to re-load the second application key into the cryptographic key storage of the security chip responsive to the second application key having been evicted from the cryptographic key storage by another key cache manager.

11. The computer product of claim 10, wherein the computer executable instructions for loading the second application key into the cryptographic key storage of the security chip include computer executable instructions for evicting a previously loaded application key from the cryptographic key storage of the security chip responsive to the cryptographic key storage being full.

12. The computer product of claim 10, further comprising computer executable instructions for:

re-loading the second application key into the cryptographic key storage using the second restoration data responsive to the second application key having been evicted from the cryptographic key storage and the second application requiring use of the second application key.

13. The method of claim 3, wherein:

loading the first application key into the cryptographic key storage of the security chip includes associating a tag with the first application key, the tag identifying the first application key as being associated with the first locality and identifying a location in the cryptographic key storage at which the first application key is stored; and re-loading the first application key into the cryptographic key storage includes re-loading the first application key into the cryptographic key storage at the location in the cryptographic key storage identified by the tag.

14. The method of claim 13, wherein the first restoration data comprises a copy of the first application key.

15. The computer product of claim 9, wherein:

the computer executable instructions for loading the first application key into the cryptographic key storage of the security chip include computer executable instructions for associating a tag with the first application key, the tag identifying the first application key as being associated with the first locality and identifying a location in the cryptographic key storage at which the first application key is stored; and the computer executable instructions for re-loading the first application key into the cryptographic key storage include computer executable instructions for re-loading the first application key into the cryptographic key storage at the location in the cryptographic key storage identified by the tag.

16. The computer product of claim 15, wherein the first restoration data comprises a copy of the first application key.

17. A computer-implemented method for:

loading a first application key into a cryptographic key storage of a security chip by a first key manager, the first application key being associated with a first locality of a memory, the first locality configured to execute a first set of applications, the security chip for encrypting and decrypting messages;

associating a first tag with the first application key, the first tag identifying a source of the key as the first key manager and a first storage address;

saving a first restoration data for the first application key by the first key manager;

evicting the first application key, responsive to the cryptographic key storage being full and a second key manager loading a second application key associated with a second locality of the memory, the second locality configured to execute a second set of applications, the second locality being different from the first locality;

associating a second tag with the first application key, the second tag identifying a source of the key as the second key manager and the first storage address;

determining that the first application key has been evicted based on the source shown in the second tag; and restoring the first application key by the first key manager, using the first restoration data.

* * * * *

UNITED STATES PATENT AND TRADEMARK OFFICE
CERTIFICATE OF CORRECTION

PATENT NO. : 7,590,845 B2  Page 1 of 1
APPLICATION NO. : 10/744441
DATED : September 15, 2009
INVENTOR(S) : Ball et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Twenty-first Day of September, 2010

David J. Kappos
*Director of the United States Patent and Trademark Office*